United States Patent
Guzzi et al.

Patent Number: 5,951,074
Date of Patent: Sep. 14, 1999

[54] FAN AND LIGHT SWITCH OPERATING DEVICE

[76] Inventors: Pasquale Guzzi; Jeanne M Guzzi, both of 1779 Shakespeare St., Sebastian, Fla. 32958

[21] Appl. No.: 09/053,296

[22] Filed: Apr. 1, 1998

[51] Int. Cl.[6] .................. A47F 13/06; B25J 1/04
[52] U.S. Cl. .......................... 294/19.1; 200/331
[58] Field of Search .............. 294/1.1, 15, 19.1, 294/22–24, 26, 50.6; 81/487, 488; 200/330, 331; 362/404, 457

[56] References Cited

U.S. PATENT DOCUMENTS

| | | | |
|---|---|---|---|
| 197,888 | 12/1877 | Pene | 294/26 X |
| 275,042 | 4/1883 | Heysinger | 200/331 X |
| 333,757 | 1/1886 | Kauth | 294/19.1 |
| 581,619 | 4/1897 | Rosenbaum | 294/19.1 |
| 606,710 | 7/1898 | Fosgate | 294/24 |
| 909,729 | 1/1909 | Wollam | 294/24 |
| 3,764,175 | 10/1973 | Yavitch | 294/19.1 X |
| 4,203,332 | 5/1980 | Corsetti | 294/19.1 X |
| 4,249,763 | 2/1981 | Provencher et al. | 294/19.1 |
| 4,899,050 | 2/1990 | Cianflone | 294/19.1 X |
| 5,016,504 | 5/1991 | Brunetto et al. | 294/19.1 X |

*Primary Examiner*—Johnny D. Cherry

[57] ABSTRACT

This tool makes it easy to reach up and operate the control switch levers of a typical ceiling fan. A slot in the washer at the end of a rod is used to engage a pull chain in order to turn on the lights or change the fan motor speed. The washer is also used to operate the reversing lever. By placing the washer above or below the switch lever, and pulling it down or pushing it up it will set the switch in the desired position.

1 Claim, 1 Drawing Sheet

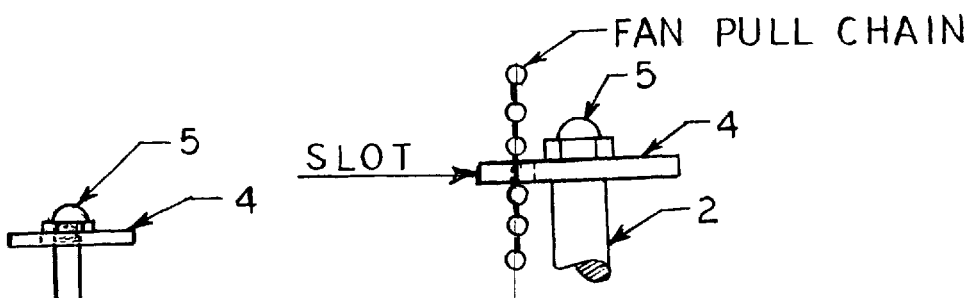
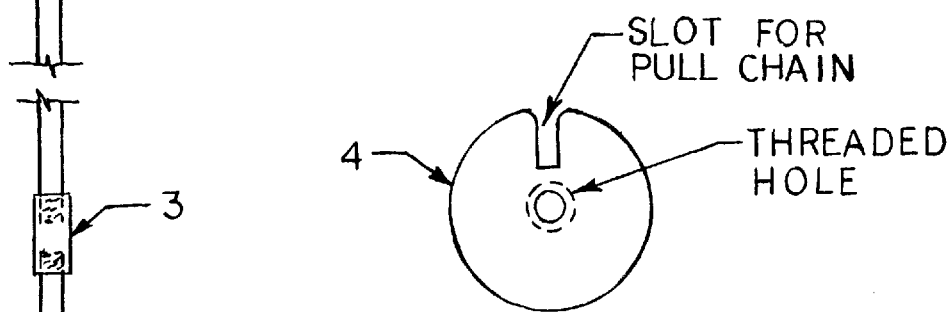
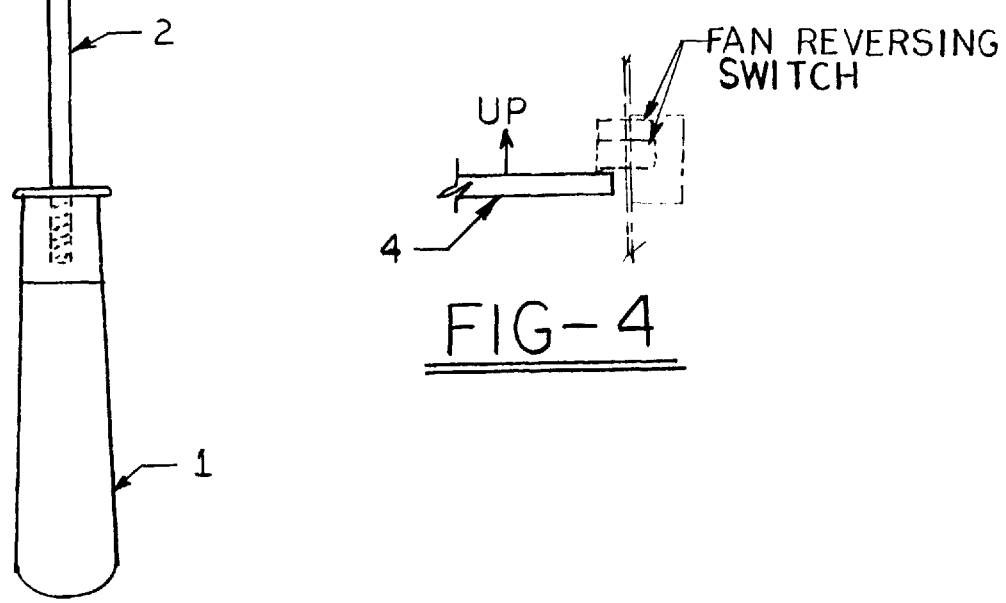

FAN AND LIGHT SWITCH OPERATING DEVICE

CROSS REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

Some businesses such as restaurants, etc. do not want the customers to operate the ceiling fan control switches. In order to avoid this, very short pull chains are used on the fan control switches so the customer can not reach them.

Normally, a ceiling fan comes with three (3) control switches located under the fan motor cover. Two (2) of these switches have a pull chain protruding out of the cover. One operates the light of the fan and the other controls the speed of the fan. The third switch is a small toggle switch also protruding from the cover and this switch controls the direction of the fan blades.

When it becomes necessary to operate these controls, a chair or ladder is brought out in order to reach the short pull chains or the reversing switch. This can be awkward and possibly costly if an employee should fall and get injured.

In order to avoid this, some places have rewired the controls and placed the switches on the wall away from the customers' reach. This is a very costly project.

BRIEF SUMMARY OF THE INVENTION

This tool can be very useful in a business as well as in the home, especially for the elderly or someone in a wheelchair. By using this tool, all one has to do is reach up with the tool, engage the desired lever and pull or push on it to get the desired results.

BRIEF DESCRIPTION OF THE SEVERAL VIEWS OF THE DRAWING

FIG. 1. This figure shows a general arrangement plan drawing showing where all the items are located. Note that this figure shows how the rod (item #2) can be used with the coupling (item #3) to add extensions as needed.

FIG. 2. This figure shows the elevation view of the pull chain being engaged with the slot in the fender washer (item #4).

FIG. 3 This view shows a plan view of the fender washer (item #4). It shows how the fender washer is cut to fit the pull chains and also one method of attaching it securely to the rod (item#2).

FIG. 4 This figure is an elevation view showing how the fender washer (item #4) is placed, before the reversing switch lever is pushed into the up position. The dotted lines show the switch in the up position after it is pushed up. In order to move the reversing switch in the down position, the procedure is reversed. The fender washer is placed on the top of the switch lever and then pulled down.

DETAILED DESCRIPTION OF THE INVENTION

This invention is a tool made to operate the controls of a ceiling fan, controls meaning the toggle switch lever on the fan cover that controls the direction of the fan rotation and also the pull chains that control the fan speed and the lights if so equipped.

This tool is made up of five (5) items as explained below:

Item 1. This item is a standard item named the handle. It is used to guide the tool to the appropriate switch lever. It is a typical file type handle.

Item 2. This item is a rod approximately 16" long, and threaded on both ends. A fine thread is preferred. The rod can be made of most any material; however aluminum was chosen due to the light weight of the material. The length of the rod makes it convenient to be taken apart and stored. One end of this rod shall be made to fit into the handle (item #1).

Item 3. This item is a standard coupling made to fit the rod. It connects two rods together as shown in the drawing (FIG. 1). More extensions can be added as needed.

Item 4. This item is a standard fender washer. A slot was cut out as shown in the drawing (FIG. 3) to enable it to fit into the spaces between the pull chain links. By engaging the slot into the pull chain in this manner and pulling down on the chain, the light or the fan speed is controlled. This item is also fastened to the rod and is held in place by Item #5 and is also threaded with a fine thread to help hold it to the rod.

Item 5, This item is a standard cap nut used to hold item #4 in place.

We claim:

1. A tool for operating the switch controls of a ceiling fan comprising an elongated rod formed with a plurality of threadedly connected members to establish a desired length, with a handle on one end of the rod and a means for engaging the switch controls on the opposite end of the rod, said means including a substantially circular washer member having a threaded hole in the center thereof for connection to the rod and a slot in the peripheral edge thereof for selective engagement with a pull chain of the fan.

* * * * *